United States Patent [19]
Laederich et al.

[11] Patent Number: 6,146,008
[45] Date of Patent: Nov. 14, 2000

[54] SYSTEM FOR DILUTING ULTRAPURE CHEMICALS WHICH IS INTENDED FOR THE MICROELECTRONICS INDUSTRY

[75] Inventors: Thierry Laederich; Hervé Dulphy; Georges Guarneri, all of Le Pont de Claix, France

[73] Assignee: Labeille S.A., Le Pont de Claix, France

[21] Appl. No.: 09/057,606

[22] Filed: Apr. 9, 1998

[30] Foreign Application Priority Data

Apr. 11, 1997 [FR] France .................................. 97 04500

[51] Int. Cl.⁷ ............................. G05D 11/02; B01F 15/02
[52] U.S. Cl. ............................. 366/136; 366/152.1; 137/3
[58] Field of Search ............................. 366/151.1, 152.1, 366/152.4, 160.1, 136, 137; 137/3, 5; 422/62, 68.1, 75

[56] References Cited

U.S. PATENT DOCUMENTS

| | | | |
|---|---|---|---|
| 4,357,110 | 11/1982 | Hope et al. | 366/137 |
| 4,823,987 | 4/1989 | Switall | 366/137 |
| 4,974,964 | 12/1990 | Yoshihara et al. | 366/152.1 |
| 5,445,193 | 8/1995 | Koeninger et al. | 366/136 |
| 5,476,320 | 12/1995 | Taguchi et al. | 366/137 |
| 5,522,660 | 6/1996 | O'Dougherty | 366/136 |
| 5,800,056 | 9/1998 | Suzuki et al. | 366/152.4 |

FOREIGN PATENT DOCUMENTS

| | | |
|---|---|---|
| 716879 | 6/1996 | European Pat. Off. |
| 96/39651 | 12/1996 | WIPO . |

OTHER PUBLICATIONS

Patent Abstract of Japan, vol. 18, No. 290, JP 06 061136 A, Mar. 4, 1994.

*Primary Examiner*—Tony G. Soohoo
*Attorney, Agent, or Firm*—Burns, Doane, Swecker & Mathis, L.L.P.

[57] ABSTRACT

System for diluting an ultrapure concentrated chemical including: (i) a first tank which contains the chemical in concentrated form having a predetermined purity P, (ii) a supply of ultrapure water of purity at least equal to P, (iii) a second tank for mixing the concentrated chemical with the ultrapure water to obtain a solution of diluted chemical whose purity is at least equal to P, (iv) a structure for adjusting the titre of the solution of diluted, chemical to a desired final concentration. The structure for adjusting the titre includes (a) a structure for measuring the titre of the dilute solution after mixing a predetermined quantity of ultrapure water with concentrated chemical of purity P so as to obtain a mixture with a concentration of chemical which is greater than the desired final concentration of the diluted chemical, (b) a structure for adding an additional quantity of ultrapure water to the mixture to obtain a second further diluted mixture, this additional quantity being at most equal to a theoretical quantity necessary for obtaining the desired titre, and (c) a structure for stirring the second further diluted mixture for a time such that the diluted chemical is recirculated on itself at least approximately three times so as to ensure that the diluted chemical is well homogenized and that the titre is substantially constant over the entire volume of the diluted chemical, and (d) a structure for checking the titre of the solution of diluted chemical; and (v) a third tank for storing the chemical.

30 Claims, 3 Drawing Sheets

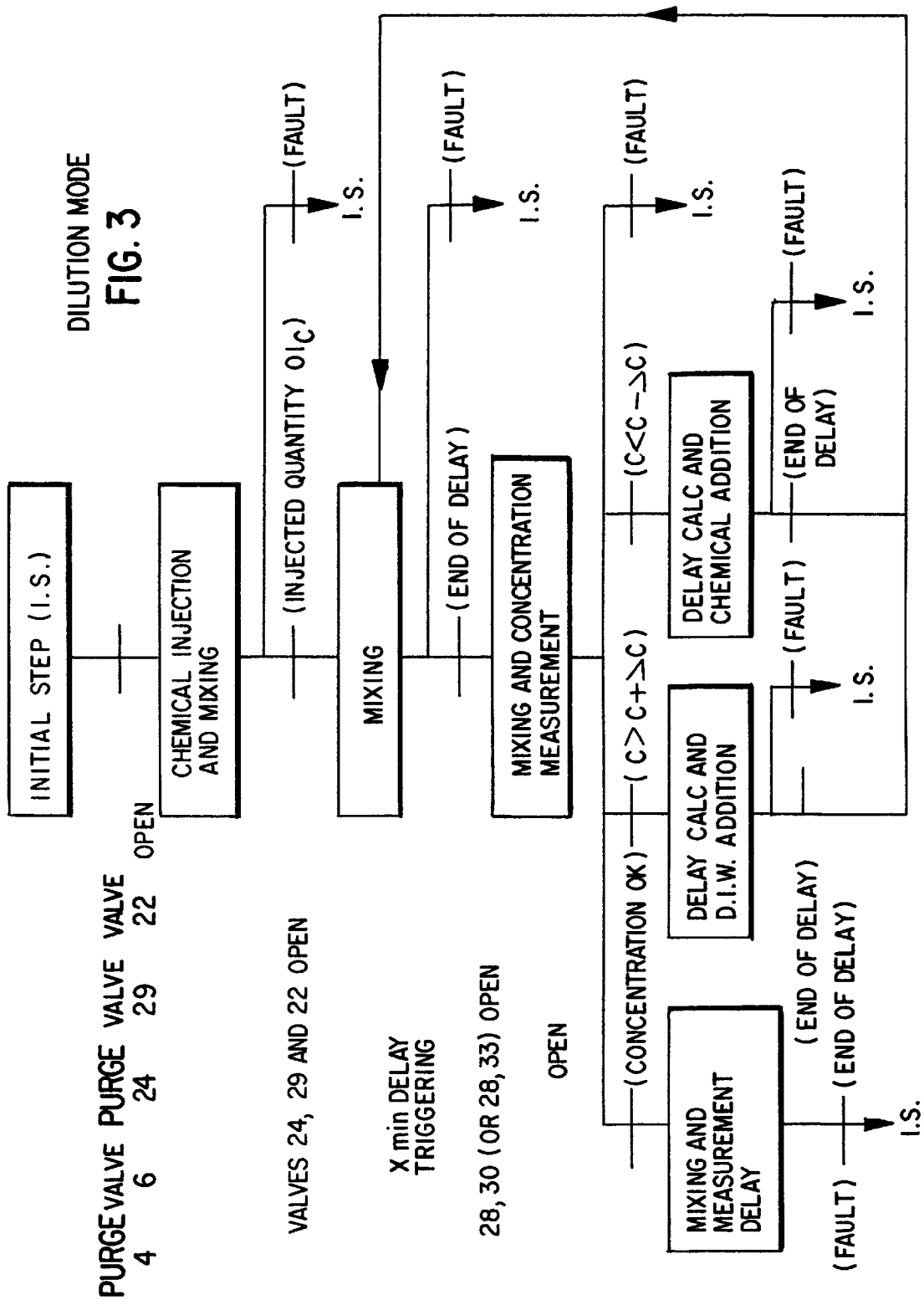
FIG. 3 DILUTION MODE

SYSTEM FOR DILUTING ULTRAPURE CHEMICALS WHICH IS INTENDED FOR THE MICROELECTRONICS INDUSTRY

This application claims priority under 35 U.S.C. §§119 and/or 365 to 97 04500 filed in France on Apr. 11, 1997; the entire content of which is hereby incorporated by reference.

BACKGROUND OF THE INVENTION

1. Field of the Invention

The present invention relates to a system for diluting ultrapure chemicals which is intended to be used in the microelectronics industry. It relates more particularly to the dilution of ultrapure concentrated chemicals so as to obtain the desired purity at their point of use during various steps in the fabrication of semiconductors.

2. Description of Related Art

In integrated-circuit fabrication processes, contamination is in general a very important concern for those involved in developing a process for fabricating these semiconductors. In modern semiconductor fabrication processes, many steps consist of various kinds of cleaning steps. These cleaning steps may consist in removing organic contaminants, metallic contaminants, photoresists used during etching or inorganic residues from these products, circuit-etching residues, nascent oxides, for example of the $SiO_2$ type, etc. At the present time, the cost of constructing and commissioning a semiconductor fabrication plant is typically of the order of one billion dollars and a large fraction of this cost relates to the various measures which are taken for monitoring particles, for cleaning and for monitoring contamination during the various semiconductor fabrication steps.

A major source of contamination consists of the impurities in chemical processes. Given that the cleaning operations are frequent and critical, contamination due to the chemistry of the cleaning must be scrupulously avoided.

Many different chemicals are used in the fabrication of semiconductors, such as aqueous ammonia, hydrochloric acid, hydrofluoric acid, silane, etc. For example, aqueous ammonia in the form of ammonium hydroxide is widely used in the various cleaning steps in the standard cleaning process called the "RCA" process. This process includes various steps and, in particular, first of all, solvent cleaning to remove most of the organic substances, using tetrachloroethylene or a solvent of this type, followed by base cleaning using a solution of hydrogen peroxide, ammonium hydroxide and ultrapure water typically in volume proportions respectively of about 1/1/5 or 1/2/7 and, finally, acid cleaning using a solution of hydrogen peroxide and hydrochloric acid in ultrapure water typically in respective volume proportions of 1/1/6 or 1/2/8.

For further details with regard to these various cleaning steps, reference should be made, for example, to the work by W. RUNYAN and K. BEAN, entitled "Semiconductors integrated circuit processing technology" (1990).

These various chemicals are often delivered to the factory gates in "bulk" form, the chemicals having a high concentration and an often-industrial purity, i.e. not suited to the purity necessary for the microelectronics industry, said products in concentrated or dilute form being purified so as to obtain ultrapure chemicals corresponding to the standards in the microelectronics industry.

An apparatus is known, from U.S. Pat. No. 5,552,660, for the blending and control of the concentration of a concentrated chemical in a diluent, which has the drawback in particular of using several measurements of the concentration of the diluted chemical, taking into account the lack of homogeneity of the solution delivered.

SUMMARY OF THE INVENTION

The present invention relates to the production of diluted solutions from concentrated chemicals already having an "electronic" purity, i.e. already being in an ultrapure form, enabling them to be used in the microelectronics industry, and for which it is desired to dilute to the exact concentration or desired titre so as to be able to use it then under the desired conditions at the point of use in the semiconductor fabrication process.

The system according to the invention is characterized in that it includes a first tank which contains the chemical in concentrated form having a predetermined purity P compatible with the purity required in the microelectronics industry, at the point where the operation using this chemical will be carried out, a supply of ultrapure water of purity at least equal to P, a second tank for mixing the concentrated chemical with the ultrapure water, making it possible to obtain a solution of diluted chemical whose purity is at least equal to P, the titre of the solution of diluted chemical being adjusted by measuring the titre of the dilute solution after mixing a predetermined quantity of ultrapure water with concentrated chemicals of purity P so as to obtain a concentration of the chemical which is greater than the desired final concentration of the diluted chemical, then by adding an additional quantity of ultrapure water to the mixture, this additional quantity being at most equal to the theoretical quantity necessary for obtaining the desired titre, and then by stirring the dilute solution for a time such that the diluted chemical is recirculated on itself at least approximately 3 times so as to ensure that the diluted chemical is well homogenized and that the titre is substantially constant over the entire volume of the diluted chemical, the titre of the solution of diluted chemical finally being checked before the chemical is stored in a third tank or sent directly to the point of use.

Preferably, the system according to the invention is characterized in that the titre of the dilute solution is adjusted by additions of ultrapure water or of concentrated chemicals if this titre is not within the desired tolerance after the stirring operation, stirring being repeated for a time similar (generally identical or longer) to that of the first stirring.

According to a preferred embodiment, the system according to the invention is characterized in that, before transfer to the third tank, a sample of diluted chemical is removed for analysis of the purity of the diluted chemical so as to be able to give the customer/user the precise composition of the diluted chemical, obtained by analysis.

Preferably, the dilute solution will be stirred for a time such that the diluted chemical is recirculated at most approximately 200 times, preferably the diluted chemical is recirculated between 10 and 50 times and very preferably for a time corresponding to the chemical being recirculated between 10 and 20 times.

According to one embodiment of the invention, the latter is characterized in that the concentrated chemical is diluted in a closed tank, stirred using an ejector.

Preferably, the desired quantity of ultrapure water is metered by weighing or any other volumetric method.

The titre of the solution of diluted chemical will preferably be measured by measuring the density of a sample of the mixture, this sample circulating in a closed-circuit line on the tank where the diluted chemical is, this measurement being performed without direct physical contact with the sample. Thus, any risk of contamination because of the measurement is avoided. The various methods, well known in themselves, making it possible to perform this measurement without physical contact with the sample, are, for example, conductimetry (a method in which an electric or magnetic field is created between two electrodes placed outside a tube containing the liquid and the resistance is measured), measurement using ultrasound, density measurement, etc.

Also preferably, the measurement of the titre will be performed by measuring the density of the diluted chemical using a densitometer precalibrated with deionized water of purity greater than P and of relative density equal to 1, before each dilution operation on the concentrated chemical.

According to another embodiment of the invention, the density measurement is performed by using a densitometer to which a sample is delivered, which sample is then thrown away so as to avoid any pollution of the diluted chemical.

The system according to the invention makes it possible to achieve precision in the titre or concentration of the dilute solution of the order of or better than $10^{-4}$ or 0.01%, as is now required for the dilutions of chemicals for development of photosensitive resins called "photoresists" or else for dilute hydrofluoric acid. The dilution apparatuses of the prior art cannot be used to achieve a precision in this dilution greater than that with regard to the titre of the diluted chemical and the volumetric or gravimetric analysis methods usually employed do not allow hope of achieving precisions better than $5 \times 10^{-3}$ or 0.5%.

The invention will be more clearly understood with the aid of the following illustrative embodiments given by way of non-limiting example, together with the figures which represent:

BRIEF DESCRIPTION OF THE DRAWINGS

FIG. 3 is a flow chart showing diagrammatically the process of diluting the pure chemical.

DETAILED DESCRIPTION OF THE PREFERRED EMBODIMENT

Figure 1:
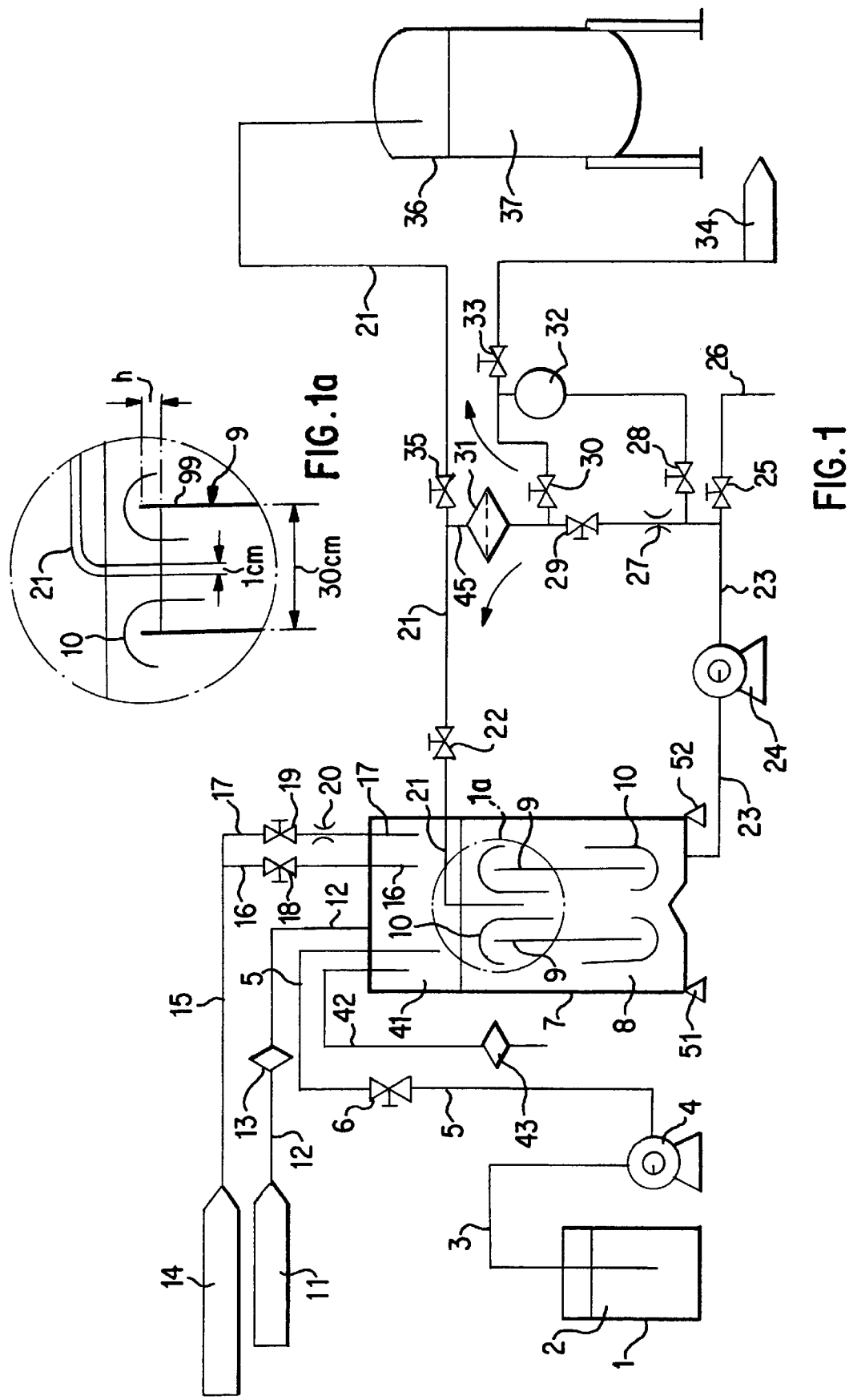
FIG. 1 is an illustrative embodiment of a dilution system according to the invention.

In FIG. 1, a drum (1) of ultrapure chemical to be diluted (2) is connected by a line (3) to a chemical-metering pump (4) or a vessel for metering the chemical to be diluted, which is used to send the pure chemical via the line (5) and the valve (6) into a mixing tank (7) containing the diluted liquid (8). This tank (7) is provided with an ejector (9) allowing effective stirring and recirculation of the chemical (8) on itself in this tank (7) as indicated by the arrows (10) in the figure. The tank (7) is maintained at a slight overpressure of high-purity nitrogen or air (41) (in particular having a level of metallic impurities of less than 10 ppt (parts per trillion) for each metal) so as to avoid any contamination of the diluted liquid (8). This tank (7) also includes a pipe (42) which connects the gaseous space (41) above the liquid (8) in the tank (7) via a venting filter (43) to atmosphere. This filter allows a substantially constant pressure to be maintained above the liquid (8): when an underpressure is created, air is filtered and drawn in through (43) and allows the pressure to be re-established. This tank (7) is also connected to a supply (11) of ultrapure nitrogen or air, as described above, via the line (12) and the filter (13), as well as to a supply of ultrapure water (14) which is used to dilute the ultrapure chemical (2) coming from the drum (1). Arranged in parallel, on the end of the line (15) connecting the ultrapure-water supply (14) to the tank (7), are a line (16) with a valve allowing ultrapure water to be injected into the tank (7) at a high rate and a line (17) with a valve (19) associated with a calibrated orifice (20) allowing ultrapure water to be injected at a low rate.

The diluted chemical can be sampled via the line (21) and the valves (22) and (35) before being stored in the storage tank (36) of diluted chemical (37).

At the base of the tank (7) there is a line (23) which, by means of the pump (24) and the valve (25), allows the said tank (7) to be purged via the purge line (26).

The diluted chemical (8) can be sampled for analysis (when (22) is open and (35) is closed) via the line (45), the filter (31) and the valves (30), (29) and (28) which allow liquid to be sampled in order to measure the concentration in the device (32) preferably by density measurement, or by conductimetry or by ultrasound, but in all cases without direct contact with the liquid chemical. The calibrated orifice (27) allows the liquid to be distributed in the two branches (28 and 29). The valve (33) allows the circuit to be purged via the discharge (34).

Shown in FIG. 1, at the bottom left, is an enlargement of the ejector consisting of a tube (21), for example having a diameter of 1 cm which is inserted to a depth h below the upper level of the outer tube (99) of the ejector (9), whose diameter is, for example, 30 cm. The depth h is preferably about a few millimeters.

Figure 2:
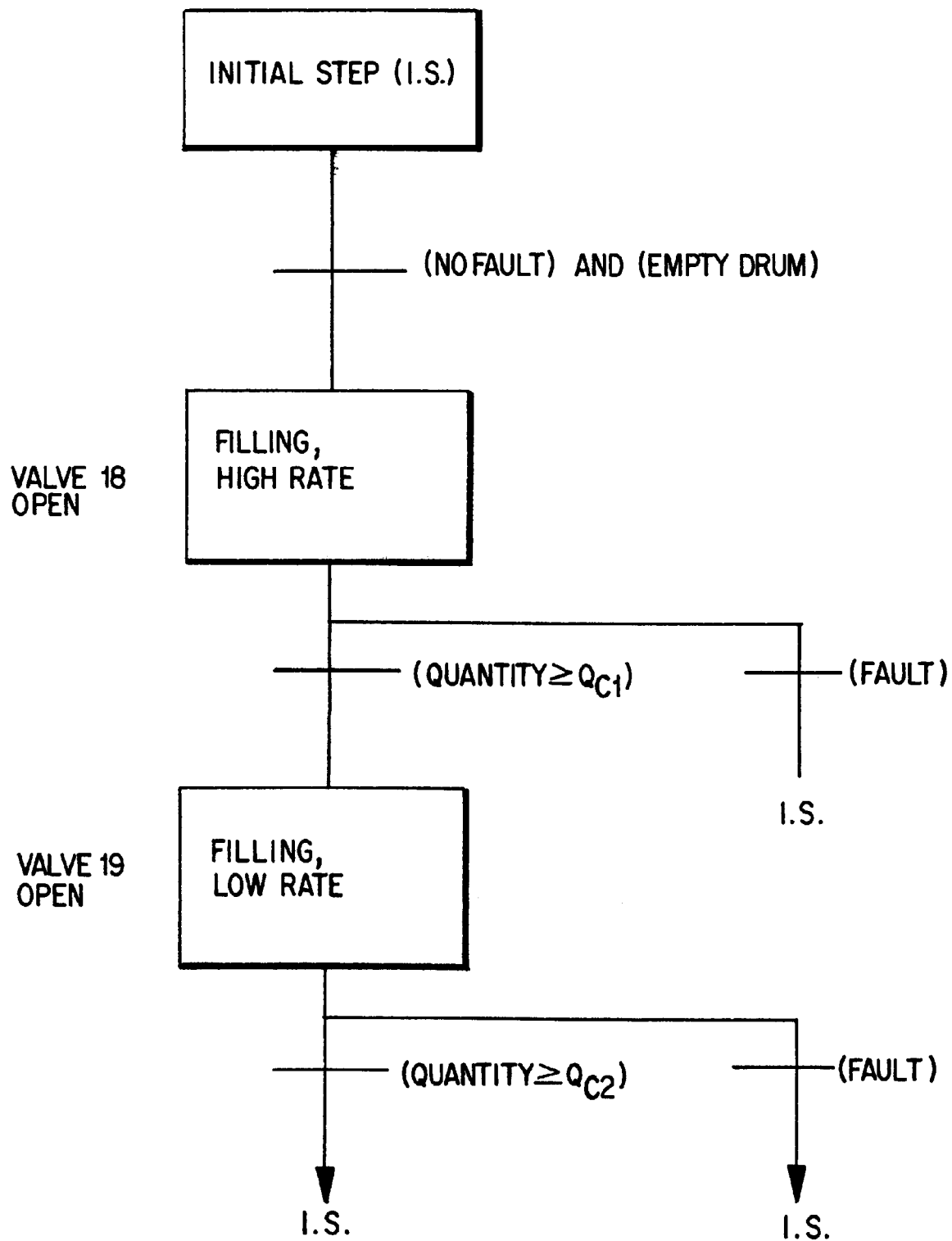
FIG. 2 is a flow diagram showing diagrammatically the filling of the chemical dilution tank.

FIGS. 2 and 3 represent diagrams explaining respectively the operation while the tank (7) is being filled (filling mode—FIG. 2) and while the apparatus is being operated in dilution mode (dilution mode—FIG. 3).

The operation of the system of FIG. 1 will now be explained with the aid of FIGS. 2 and 3.

1) Filling mode:

First of all, the tank (7) is filled with ultrapure deionized water. The end of the filling operation may be controlled by a volumetric counter controlling a valve or by weighing or by level measurement or any other suitable means allowing a precise quantity of water to be delivered into this tank (7). With the valve 18 open, the tank is filled at a high rate, this valve then being closed before opening the valve (19) and filling at a low rate, as clearly explained in FIG. 2. The process then passes to the step of diluting the chemical.

2) Dilution mode:

The pump is switched on and then the process analyser is reset to 0. Next, a fixed quantity of chemical is added to the tank and then the titre of the solution thus obtained is measured after the solution has been stirred by means of the circulation within the tank with the aid of the ejector so that the chemical is recirculated about twenty times. The situation will always be one in which there is an excess of concentrated chemical to be diluted. Next, the titre of the solution is adjusted by sequentially adding small quantities of water—deionized water coming from the tank, until the desired titre is obtained, the achievement of this titre being signalled by the analyser which transmits its input to the automatic control device. The latter closes the valve.

Next, the titre of the dilute solution is stabilized, for example by agitated stirring for approximately 10 min. This stirring using the ejector, as described in FIG. 1, may consist of the liquid almost completely recirculating on itself at least 3 times by means of the ejector so as to obtain good homogenization. The duration of this homogenization operation will in general not be longer than the time necessary for the chemical to be recirculated on itself at most 200 times, preferably from 10 to 50 times. The optimum is generally achieved with the chemical being recirculated on itself between 10 and 20 times. After this stabilization step, with stirring, and if the measurement of the titre indicates a value which is within the desired tolerance, the chemical is transferred to the storage tank (36) and, when the latter is full, if necessary a sample of this dilute solution (37) is removed for general analysis of the composition of the solution, for example by ICP-MS. If on the contrary the titre is not within the desired tolerance, water is added, if the titre is too high, or concentrated chemical is added, if the titre is too low, and the procedure of adjustment, stirring, etc. is continued (return to I.S. in the figure).

What is claimed is:

1. System for diluting an ultrapure concentrated chemical comprising
   (i) a first tank which contains said chemical in concentrated form having a predetermined purity P,
   (ii) a supply of ultrapure water of purity at least equal to P,
   (iii) a second tank for mixing the concentrated chemical with the ultrapure water to obtain a solution of diluted chemical whose purity is at least equal to P,
   (iv) means for adjusting the titre of the solution of diluted chemical to a desired final concentration comprising
      (a) means for measuring the titre of the dilute solution after mixing a predetermined quantity of ultrapure water with concentrated chemical of purity P so as to obtain a mixture with a concentration of chemical which is greater than the desired final concentration of the diluted chemical,
      (b) means for adding an additional quantity of ultrapure water to the mixture to obtain a second further diluted mixture, this additional quantity being at most equal to a theoretical quantity necessary for obtaining the desired titre, and
      (c) an ejector stirrer having an outer tube of predetermined diameter and an inner tube disposed in said outer tube, wherein said inner tube extends to a predetermined depth h beyond the outer tube in said second further diluted mixture, and further stirs the second mixture for a time such that the diluted chemical is recirculated on itself at least approximately three times so as to ensure that the diluted chemical is well homogenized and that the titre is substantially constant over the entire volume of the diluted chemical, and
      (d) means for checking the titre of the solution of diluted chemical; and
   (v) a third tank for storing the chemical.

2. System according to claim 1, wherein said means for adjusting the titre of the solution carries out an addition of ultrapure water or of concentrated chemical if this titre is not within a desired tolerance after the stirring, said stirring being repeated for a time similar to that of the first stirring.

3. System according to claim 1, wherein said stirring means is capable of stirring the dilute solution for a time such that the diluted chemical is recirculated at most approximately two hundred times.

4. System according to claim 1, wherein said stirring means is capable of stirring the dilute solution for a time allowing the diluted chemical to be recirculated between 10 and 50 times.

5. System according to claim 1, wherein said stirring means is capable of stirring the dilute solution for a time allowing the diluted chemical to be recirculated between 10 and 20 times.

6. System according to claim 1, wherein said stirring means is in the second tank.

7. System according to claim 1, wherein said second tank where the concentrated chemical is diluted is a closed tank.

8. System according to claim 7, wherein said stirring means is an ejector.

9. System according to claim 1, further comprising means for metering the quantity of ultrapure water by weighing or any other volumetric method.

10. System according to claim 1, wherein said means for measuring the titre of the solution carries out measurement without physical contact with a sample thereof.

11. System according to claim 1, wherein said means for measuring the titre of the solution of diluted chemical measures density of a sample of the mixture circulating in a closed-circuit line without direct physical contact with the sample.

12. System according to claim 1, wherein said means for measuring operates by conductimetry, without direct physical contact with a sample of the solution.

13. System according to claim 1, wherein said means for measuring measures transmission velocity of a sound wave through a sample of the solution without physical contact with the latter.

14. System according to claim 1, wherein said ultrapure chemical is selected from the group consisting of water containing mixtures, acid, ammonia, hydrogen peroxide ammonium hydroxide and mixtures thereof.

15. System according to claim 14, wherein the chemical in concentrated form in said first tank has a predetermined purity P compatible with a purity required in microelectronics manufacture.

16. A method for diluting an ultrapure concentrated chemical comprising the steps of:
   (i) mixing (a) said chemical in concentrated form having a predetermined purity P with (b) ultrapure water of purity at least equal to P to obtain a solution of diluted chemical having a given titre whose purity is at least equal to P so as to obtain a mixture with a concentration of chemical which is greater than the desired final concentration of the diluted chemical,
   (ii) measuring the titre of the dilute solution after said mixing step (i);
   (iii) adding an additional quantity of ultrapure water to the mixture to obtain a second further diluted mixture, this additional quantity being at most equal to a theoretical quantity necessary for obtaining the desired titre,
   (iv) mixing the concentrated chemical with the ultrapure water in a closed tank using an elector stirrer having an outer tube of predetermined diameter and an inner tube disposed in said outer tube, wherein said inner tube extends to a predetermined depth h beyond the outer tube,
   (iv) stirring the second further diluted mixture for a time such that the diluted chemical is recirculated on itself at least approximately three times so as to ensure that the diluted chemical is well homogenized and that the titre is substantially constant over the entire volume of the diluted chemical, and
   (v) checking the titre of the solution of diluted chemical.

17. Process according to claim 16, further comprising the step of storing the solution obtained in step (v).

18. Process according to claim 16, wherein said ultrapure chemical is one which is employed in fabricating an electronic microcircuit.

19. Process according to claim 16, wherein the chemical in concentrated form has a predetermined purity P compatible with a purity required in microelectronics manufacture.

20. Process according to claim 16, comprising:

adding ultrapure water or concentrated chemical to adjust the titre of the dilute solution if this titre is not within a desired tolerance after the step of (iv) of stirring, and repeating stirring for a time similar to that of the step (iv) of stirring.

21. Process according to claim 16, comprising stirring the dilute solution for a time such that the diluted chemical is recirculated at most approximately two hundred times.

22. Process according to claim 21, comprising stirring the dilute solution for a time allowing the diluted chemical to be recirculated between 10 and 50 times.

23. Process according to claim 22, comprising stirring the dilute solution for a time allowing the diluted chemical to be recirculated between 10 and 20 times.

24. Process according to claim 16, further comprising the step of metering the quantity of ultrapure water by weighing or any other volumetric method.

25. Process according to claim 16, comprising measuring the titre of the solution without physical contact with a sample of the solution.

26. Process according to claim 16, comprising measuring the titre of the solution of diluted chemical by measuring density of a sample of the mixture circulating in a closed-circuit line without direct physical contact with the sample.

27. Process according to claim 16, comprising measuring the titre of the solution of diluted chemical by conductimetry, without direct physical contact with a sample of the solution.

28. Process according to claim 16, comprising measuring the titre of the solution of diluted chemical by measuring transmission velocity of a sound wave through a sample of the solution without physical contact with the latter.

29. Process according to claim 16, comprising measuring the titre of the solution of diluted chemical by a measurement system precalibrated using deionized water of purity greater than P.

30. Process according to claim 29, wherein said measurement system is precalibrated before each operation of diluting the concentrated chemical.

* * * * *